Figure 1:
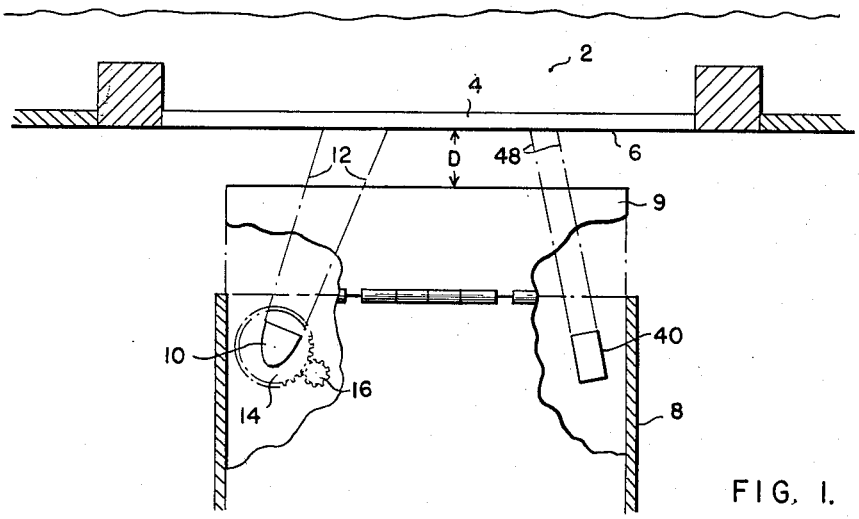

Feb. 26, 1957  W. K. JACKSON  2,783,450
CLEARANCE INDICATING APPARATUS
Filed May 13, 1954

INVENTOR.
WILLIAM K. JACKSON 2,783,450
Patented Feb. 26, 1957

2,783,450

CLEARANCE INDICATING APPARATUS

William K. Jackson, Levittown, Pa., assignor of one-half to Frederick Spritz, Philadelphia, Pa.

Application May 13, 1954, Serial No. 429,462

2 Claims. (Cl. 340—61)

This invention relates to clearance indicating apparatus and has particular reference to means for determining approximately the clearance of a vehicle, using this term in a broad sense, with reference to an obstruction.

While, as will appear, the invention is of quite broad applicability, it is particularly adapted for the determination of clearance between a truck and a loading platform and will be specifically so described. In backing trucks or trailers, particularly large ones, to platforms for loading and unloading, the driver has difficulty in locating the tail-gate of the truck or trailer sufficiently close to the loading platform without the assistance of a helper to signal the extent of approach. Even with such assistance, damage to the truck and/or the loading platform is frequent. It is one object of the present invention to provide means for indicating to the driver the relative positions of his truck or trailer and the platform. It is unnecessary to determine the spacing continuously and in accordance with the present invention increments of spacing are indicated. As will become evident, the indications become more sensitive as the approach becomes closer, as is, of course, desired to avoid damage and to insure proper relative location for the loading or unloading operations.

In accordance with the invention, an intense beam of light from a source carried by the truck is swept horizontally across the upright face of the loading platform, the beam being confined so that the illuminated area is at any instant small. The truck also carries a photocell arrangement which has a restricted field of view of the loading platform. As the area of the illumination sweeps across the platform edge, it will pass into the field of view of the photocell momentarily, and by proper commutation and control, as will hereafter be described, the entry of the illuminated area into the field of view of the photocell will be indicative of the position of the truck relative to the platform, a simple triangulation being involved. In the preferred form of the invention an indicator is provided which is visible to the truck driver and takes the form of a series of small lamps which are respectively indicative of particular distances. In ordinary operation one, or sometimes simultaneously two, of the lamps will flash to give the operator a clear indication of the clearance.

While the invention has just been described specifically as applicable to the clearance between a truck or trailer and a loading platform, it will be evident that the invention is applicable in many other instances where a clearance is difficult to ascertain by the driver of a vehicle. In the docking of ships, particularly large ones, clearances with docks are substantially invisible to the helmsman and he must depend upon the signals from observers to guide him in docking. Large aircraft also involve problems of low visibility of clearances and, in particular, the pilot must often be careful of wing-tip and tail clearances. Furthermore, it is difficult for a pilot in landing to ascertain how close he may be to a runway.

Figure 2:
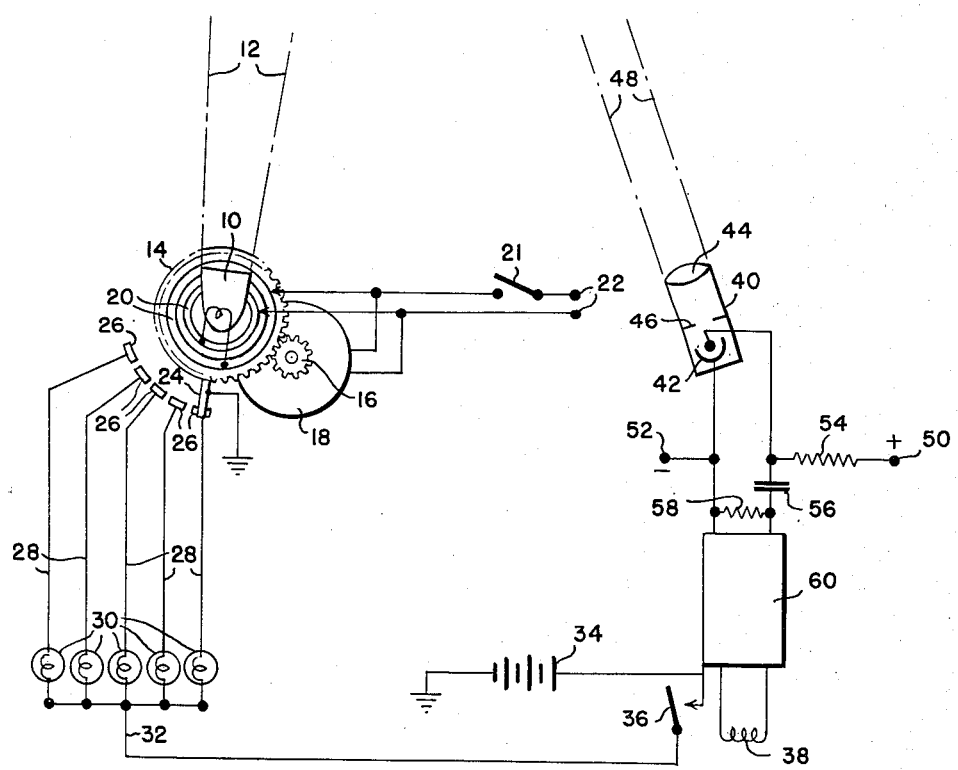

A similar problem of bottom clearance occurs in the case of the maneuvering of boats through shallow waters where clearances between the bottom of the boat and the water bottom must be carefully watched. The present invention is applicable to many such situations and its subsidiary objects relating particularly to details of construction and operation will become apparent from the following description read in conjunction with the accompanying drawing, in which:

Figure 1 is a diagrammatic horizontal sectional view, with certain parts broken away, showing, in particular, the application of the invention to the problem of locating a vehicle adjacent to a loading platform; and Figure 2 is a diagram showing both mechanical and electrical arrangements of a preferred form of the apparatus.

Referring first to Figure 1, there is illustrated therein a loading platform 2 which is provided with a sill 4 having, as is usual, a vertical face 6 presented outwardly toward the truck or trailer which is to be loaded or unloaded. The vehicle body is generally indicated at 8 and may, as is common, be provided with a hinged tail-gate 9 which is lowered for the purpose of loading or unloading and is to be brought into close proximity with the sill 4. The distance D indicated in Figure 1 is critical, and must be sufficiently small to permit ready handling of the goods and, at the same time, must not be reduced to zero which would represent a crashing condition. In accordance with the invention, there is desirably mounted below the vehicle body two mechanical assemblies one of which comprises a source of illumination and the other a photocell pick-up unit, these being desirably mounted in a common horizontal level corresponding to that of the face 6 of the sill.

Reference may now be made to Figure 2 which shows details of the apparatus.

There is indicated a projection lamp assembly 10 which may take the form of a standard spotlight capable of projecting an intense light beam within limits which are horizontally restricted as indicated by the lines 12. The result is the projection on the face 6 of the sill of a limited intensely illuminated area. The light 10 is mounted upon a gear 14 which meshes with a pinion 16 carried by the shaft of a motor 18. Slip rings 20 carried by the gear 14 are connected to the terminals of the lamp filament and engage brushes which are connected to terminals 22 through a switch 21 which is under control of the driver, the switch 21 also supplying current to the motor 18 from the terminals 22 which may be connected to the usual vehicle battery. Upon closure of switch 21 the lamp is illuminated and continuously rotated to provide a sweep of the projected beam.

The gear 14 carries a brush 24 which is arranged to make selective contact as the gear rotates with segments 26 of a commutating arrangement, which segments are fixed and connected individually as indicated at 28 to lamps 30 which may be located in a panel in the cab of the truck or trailer where they will be visible to the driver. A common connection 32 joins the lamp filaments through a relay armature 36 and battery 34 to ground, the movable contact 24 also being grounded. The battery 34 may, of course, be that of the vehicle.

A housing 40 encloses a photocell 42 and is provided with a lens 44 and diaphragm 46 arranged to restrict the effective field of view of the photocell horizontally as indicated by the lines 48. The photocell is energized from terminals 50 and 52 through a load resistor 54 and the output is delivered through the differentiating network comprising condenser 56 and resistor 58 to an amplifier 60 the output of which is arranged to energize the relay 38 and close the contact at armature 36 when a differentiated signal is received by the amplifier from the photocell arrangement. The use of a differentiating network is desirable to eliminate the effects which might be produced if, for example, the loading platform was illuminated by bright sunlight. In short, only a change of illumination will be effective to operate the relay 38.

The operation of the arrangement will now be evident, and it may be assumed that the vehicle is backing toward the loading platform. As the beam of illumination sweeps across the face 6 of the platform it will intercept the line of view of the photocell 42 and produce momentary closure of the relay. The phase of the interception, referred to the rotation of the lamp 10, will depend upon the distance D of the critical portion of the vehicle, such as the end of the tailgate, from the loading platform. The angle of the beam 12 at the time of signal pick-up by the photocell is, of course, a matter of simple geometry determined by the initial setting of the photocell line of view and the spacing between the photocell unit and the lamp. The phase angle of the beam position is related to the segments 26 of the commutating arrangement, and it will be evident that only that lamp 30 will be illuminated which corresponds to the angular position of the beam 12 at the time the spot of light intersects the line of view of the photocell to give rise to closure of the relay contacts. The various lamps 30, therefore, may be calibrated in terms of distance, and even if the segments 26 are evenly spaced, it will be evident that the sensitivity increases as the distance D decreases. The lamps, therefore, may be designated, for example, six inches, one foot, two feet, four feet, etc., to give more sensitive indications as the vehicle approaches its proper position. The arrangement is desirably such that the contact arm 24 will, in passing from one segment 26 to the next, engage both for a limited time, thus giving even finer indication of distance by the simultaneous intermittent illumination of two of the lamps 30.

It will be evident that arrangements other than that disclosed may be used for rotating a beam of light or, in general, for securing the triangulation arrangement which may be used for distance determination. Among methods of securing a sweep of a light beam there may be mentioned the use of a stationary lamp and a rotating mirror or prism, or of a plurality of mirrors so that a number of repetition cycles may occur during a single revolution. Occulting means may also be used in similar fashion. It will also be evident that the lamp might be fixed so as to project a fixed beam while the photocell arrangement could be rotated, either the photocell unit being rotated or there being rotated a mirror or prism system to direct the light to the photocell; but in most cases this arrangement would not be desirable since spurious results would be secured in scanning by the photocell of a surface non-uniformly illuminated by a source or sources other than that forming part of the measuring system. In any case, a commutating arrangement can be provided for determining phase of the signal condition to convert the signal into an indication of distance.

What is claimed is:

1. Apparatus for indicating clearance between relatively movable bodies, one of which carries said apparatus, said apparatus comprising means providing a light beam, means mounting a photocell having a restricted field of view, means moving one of said two means and providing periodic intersection of said light beam and said field of view, and signalling means responsive to the output of said photocell and indicating intersection of said light beam and said field of view at a surface of the other of said bodies, said signalling means including a plurality of lamps and commutating means actuated by said moving means for selecting successive lamps for connection to said photocell providing for illumination of the one of said lamps connected to the output of said photocell upon intersection of said light beam and said field of view at said surface, the lamp illuminated indicating the angle of convergence of the light beam and said field of view at the time of said intersection.

2. Apparatus as set forth in claim 1 including means positioned between said photocell and said signalling means for differentiating the output of said photocell.

References Cited in the file of this patent
UNITED STATES PATENTS

| 1,356,285 | Hopper | Oct. 19, 1920 |
| 2,317,652 | Toney | Apr. 27, 1943 |
| 2,350,820 | Rettinger | June 6, 1944 |
| 2,379,496 | Saunier | July 3, 1945 |